United States Patent

Aprill

[11] Patent Number: 5,176,221
[45] Date of Patent: Jan. 5, 1993

[54] HOOF COVERING

[76] Inventor: Kaye Aprill, 11340 E. Shore Dr., Whitmore Lake, Mich. 48189

[21] Appl. No.: 772,070

[22] Filed: Oct. 7, 1991

[51] Int. Cl.$^5$ ............................................... A01L 3/00
[52] U.S. Cl. .......................................... 168/18; 54/82
[58] Field of Search ...................... 168/18, 17, 1, 4, 20, 168/2, DIG. 1; 54/82; 132/73

[56] References Cited

U.S. PATENT DOCUMENTS

| | | |
|---|---|---|
| D. 33,615 | 11/1990 | Smith . |
| 152,975 | 7/1874 | Dean ....................................... 168/1 |
| 230,155 | 7/1880 | Spence . |
| 398,834 | 3/1889 | Hoyt . |
| 498,302 | 5/1893 | Pooler . |
| 815,208 | 3/1906 | O'Donnell . |
| 2,041,538 | 5/1936 | Gash et al. ............................... 168/4 |
| 2,688,331 | 9/1954 | Bogoslowsky .......................... 132/73 |
| 3,236,310 | 2/1966 | Quick ..................................... 168/18 |
| 3,386,226 | 6/1968 | Code et al. . |
| 4,470,466 | 9/1984 | Nakanishi . |
| 4,860,736 | 8/1989 | Kaitz et al. ............................. 132/73 |

FOREIGN PATENT DOCUMENTS

| | | | |
|---|---|---|---|
| 9003110 | 4/1990 | PCT Int'l Appl. ................... | 168/17 |
| 709286 | 5/1954 | United Kingdom .................. | 132/73 |

Primary Examiner—Gene Mancene
Assistant Examiner—Todd E. Manahan
Attorney, Agent, or Firm—Gifford, Groh, Sprinkle, Patmore and Anderson

[57] ABSTRACT

A covering for the hoof of a horse is disclosed having a flexible sheet with a first side and a second side. The sheet is dimensioned so that a first side of the sheet flatly abuts against and covers the hoof of a horse. An adhesive coating on the first side of the sheet is provided for removably securing the covering to the horse's hoof. The other or outer side of the sheet has a glossy black, or flat black, or clear appearance which is highly desirable for show horses.

2 Claims, 1 Drawing Sheet

HOOF COVERING

BACKGROUND OF THE INVENTION

I. Field of the Invention

The present invention relates to a covering for a horse's hoof.

II. Description of the Prior Art

In horse shows, points are awarded to the various contestants based not only upon the performance of the horse and its rider, but also the appearance of the horse. Furthermore, polished (black or clear) hoofs are considered to be highly desirable for show horses.

Consequently, it has been the prior practice to apply hoof polish to the horse's hoofs prior to the show. Such hoof polish provides a finished appearance for the horse's hoofs which is desired during the horse show.

This previously known practice of shining the horse's hoofs with hoof polish, however, has not proven wholly satisfactory in use. One disadvantage of this previously known practice is that it is a very messy operation to apply the hoof polish to the horse's hoofs. Furthermore, many horses fail to cooperate during the application of the hoof polish oftentimes causing smears to the other legs of the horse and/or on clothing, hands, etc. of person applying polish.

A still further disadvantage of this previously known practice is that, following the show, it is difficult to remove the hoof polish from the horse's hoofs. Oftentimes an acetone remover or sandpaper is used to remove the polish. Both of these methods, however, also remove the outer protective layer of the hoof which can result in hoof problems for the horse over time. Furthermore, in view of the difficulty in removing the polish after the show, some hoof polish usually remains on the horse's hoofs. This disadvantageously interferes with the natural moisture absorption of the hoof necessary to maintain the health of the hoof.

Lastly, hoof polish applied to the horse's hoofs remains somewhat sticky until the polish is completely dried which oftentimes takes an extended period of time. During that time, dirt and other debris can become adhered to the horse hoofs thus detracting the overall appearance of the horse during the show.

SUMMARY OF THE PRESENT INVENTION

The present invention provides a cover for the horse's hoofs which overcomes all of the above mentioned disadvantages of the previously known practices.

In brief, the covering of the present invention comprises a flexible sheet having a first side and a second side. The sheet is preferably made of vinyl and is dimensioned so that one side of the sheet flatly abuts against and substantially covers the horse's hoofs.

An adhesive coating is provided on the first side of the sheet so that the first side of the sheet adheres to the horse's hoof once the sheet is wrapped over the horse's hoof and pressed onto the hoof. The adhesive, however, removably secures the sheet to the horse's hoof so that the sheet, together with the adhesive, can be removed from the hoof following the show.

The other or outwardly facing side of the sheet exhibits a glossy black, flat black or clear appearance. Such a finished appearance is highly desirable during the horse show.

BRIEF DESCRIPTION OF THE DRAWING

A better understanding of the present invention will be had upon reference to the following detailed description, when read in conjunction with the accompanying drawing wherein like reference characters refer to like parts throughout the several views, and in which.

DETAILED DESCRIPTION OF A PREFERRED EMBODIMENT OF THE PRESENT INVENTION

Figure 1:
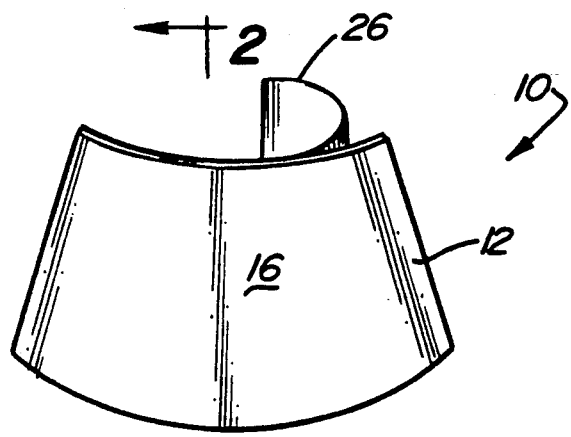
FIG. 1 is a plan view illustrating a preferred embodiment of the present invention.
Figure 2:
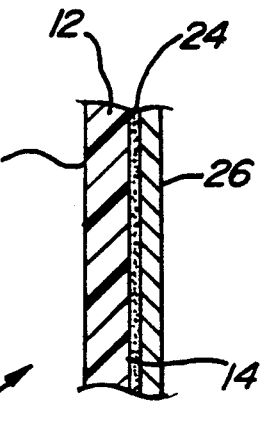
FIG. 2 is a fragmentary sectional view taken substantially along line 2—2 in FIG. 1 and enlarged for clarity.

With reference first to FIGS. 1 and 2, a preferred embodiment of the covering 10 of the present invention is thereshown and comprises a thin sheet 12 having a first side and a second side 16. The sheet 12 is constructed of any suitable flexible material, such as vinyl, although other materials may be alternatively used.

Figure 3:
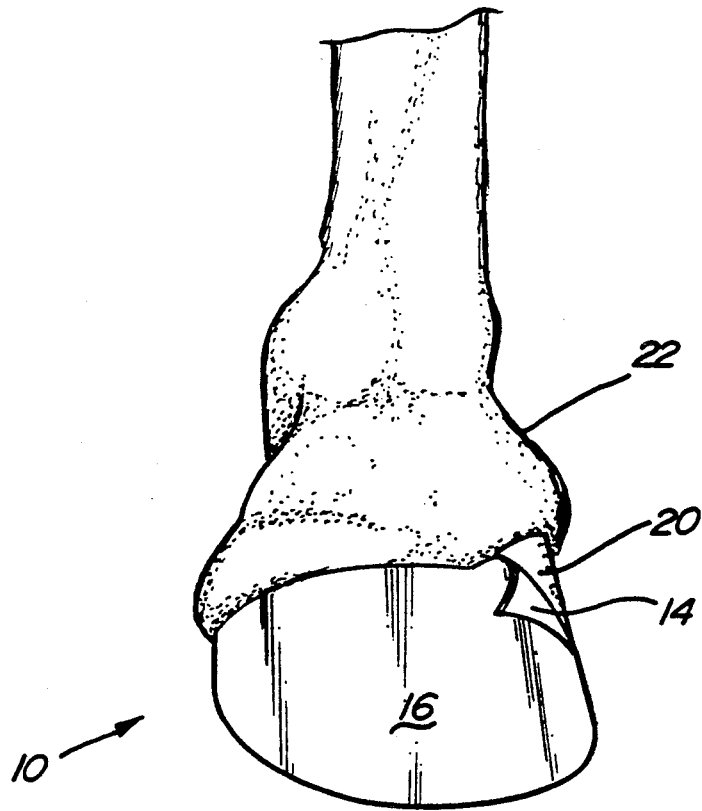
FIG. 3 is an elevational view illustrating the operation of the present invention.

As best shown in FIGS. 1 and 3, the sheet 12 is dimensioned so that the side 14 of the sheet 12 flatly abuts against and substantially covers a hoof 20 of a horse 22. The sheet has the shape of segment of a generally frusto-conical surface, as best shown in FIG. 1. The sheet 12 may be trimmed as required to eliminate overhang of the sheet 12 with respect to the hoof 20.

With reference now to FIGS. 1-3, an adhesive coating 24 (FIG. 2) is provided on the first side 14 of the sheet 12. This adhesive coating 24 serves to removably secure the sheet 12 to the horse's hoof 20 as shown in FIG. 3. When desired, for example after a horse show, the entire sheet 12 together with the adhesive coating 24 can be easily removed from the horse's hoof 20 by peeling the sheet 12 with the adhesive coating 24 from the horse's hoof.

As best shown in FIGS. 1 and 2, in order to protect the adhesive coating 24 from dust, dirt and other debris prior to securing the sheet 12 to the horse's hoof 20, a removable paper backing 26 overlies the adhesive coating 24. This paper backing 26 thus protects the adhesive coating 24 from dust and other debris prior to use. When attachment of the sheet 12 to the horse's hoof is desired, however, the paper backing 26 is removed from the adhesive coating 24 and the sheet 12 applied to the horse's hoof 20 in the previously described fashion.

The outwardly facing side 16 of the sheet 12, i.e. the side 16 of the sheet 12 opposite from the adhesive coated side 14, exhibits a glossy or flat black, or clear appearance. As such, the sheet 12 simulates appearance of a highly polished horse's hoof as is desired for the horse show.

After removal of the hoof covering or sheet, the sheet can be reattached to the hoof by using a double sided adhesive sheet which is first applied to the hoof and the hoof covering is then applied to the other side of the double sided adhesive sheet.

From the foregoing, it can be seen that the present invention provides a simple, inexpensive and yet totally effective covering for a horse's hoofs for use at horse shows. This covering can not only be easily and rapidly applied, but also easily and rapidly removed when desired subsequent to the horse show. Furthermore, the present invention overcomes the previously known disadvantage of polishing the horse's hoofs with hoof polish.

Having described my invention, however, many modifications thereto will become apparent to those skilled in the art to which it pertains without deviation from the spirit of the invention as defined by the scope of the appended claims.

I claim:

1. For use on a hoof of a horse, a covering for the hoof comprising:

a flexible sheet having a first side and a second side, said sheet having an area substantially the same as the area of the hoof, said sheet having a shape of a segment of a frusto-conical surface and corresponding generally to the shape of the side wall of the hoof, said sheet being dimensioned so that said first side of said sheet flatly abuts against and substantially covers the side wall of the hoof, and means on said first side of said sheet for removably and adhesively securing said sheet to the side wall of the hoof, wherein said sheet is vinyl and further comprising a shiny surface on said second side of said sheet, wherein said shiny surface is black.

2. The invention as defined in claim 1 and comprising a removable backing sheet overlying said first side of said flexible sheet.

* * * * *